US010686957B2

(12) United States Patent
Kawaguchi et al.

(10) Patent No.: US 10,686,957 B2
(45) Date of Patent: Jun. 16, 2020

(54) IMAGE PROCESSING APPARATUS AND METHOD OF CONTROLLING THE SAME

(71) Applicant: Konica Minolta, Inc., Tokyo (JP)

(72) Inventors: Toshikazu Kawaguchi, Kobe (JP); Shinya Hashimoto, Nishinomiya (JP); Yuki Asai, Itami (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/426,923

(22) Filed: May 30, 2019

(65) Prior Publication Data

US 2019/0373129 A1 Dec. 5, 2019

(30) Foreign Application Priority Data

May 30, 2018 (JP) ................................ 2018-103753

(51) Int. Cl.
*H04N 1/00* (2006.01)
*G06F 21/55* (2013.01)
*G06F 21/56* (2013.01)

(52) U.S. Cl.
CPC ....... *H04N 1/00925* (2013.01); *G06F 21/554* (2013.01); *G06F 21/561* (2013.01); *H04N 1/00005* (2013.01); *H04N 1/00037* (2013.01); *H04N 1/00074* (2013.01); *G06F 2221/034* (2013.01); *H04N 2201/0094* (2013.01)

(58) Field of Classification Search
None
See application file for complete search history.

(56) References Cited

U.S. PATENT DOCUMENTS

| 10,318,734 | B2 * | 6/2019 | Young | G06F 21/552 |
| 2003/0088680 | A1 * | 5/2003 | Nachenberg | G06F 21/56 709/229 |
| 2003/0088705 | A1 * | 5/2003 | Katagishi | G06F 21/56 709/246 |
| 2004/0117401 | A1 * | 6/2004 | Miyata | G06F 21/564 |
| 2004/0193895 | A1 * | 9/2004 | Kaneko | G06F 21/566 713/188 |

(Continued)

FOREIGN PATENT DOCUMENTS

| JP | 2006256104 A * | 9/2006 |
| JP | 2006256104 A | 9/2006 |

(Continued)

OTHER PUBLICATIONS

European Search Report issued in corresponding European Patent Application No. 19176169.1, dated Oct. 7, 2019 (7 pages).

*Primary Examiner* — Ted W Barnes
(74) *Attorney, Agent, or Firm* — Osha Liang LLP

(57) ABSTRACT

An image processing apparatus that executes a plurality of processes related to a file, includes: a memory that stores a file; a processor that executes virus checking on the file. The memory stores: virus type information that associates a type of a virus detected during the virus checking with at least one of the plurality of processes; and file type information that associates a type of file with at least one of the plurality of processes, and the processor restricts one of the plurality of processes associated with the type of the detected virus, and another of the plurality of processes associated with the type of file possibly infected with the detected virus.

17 Claims, 11 Drawing Sheets

VIRUS TYPE INFORMATION

| | COMMUNICATION FUNCTION | PRINT FUNCTION | SCAN FUNCTION | FILE TRANSMISSION FUNCTION | BROWSER FUNCTION |
|---|---|---|---|---|---|
| VIRUS A (LEAK INTERNAL DATA) | DISABLED | ENABLED | ENABLED | DISABLED | DISABLED |
| VIRUS B (DISABLE INTERNAL DEVICES) | ENABLED | DISABLED | DISABLED | DISABLED | ENABLED |
| VIRUS C (VIEW PARTICULAR SITE) | DISABLED | ENABLED | ENABLED | ENABLED | DISABLED |
| VIRUS D (TAMPER WITH INTERNAL DATA) | ENABLED | DISABLED | DISABLED | DISABLED | ENABLED |
| : | : | : | : | : | : |

FILE TYPE INFORMATION

| | COMMUNICATION FUNCTION | PRINT FUNCTION | SCAN FUNCTION | FILE TRANSMISSION FUNCTION | BROWSER FUNCTION |
|---|---|---|---|---|---|
| IMAGE FILE | ENABLED | DISABLED | DISABLED | DISABLED | ENABLED |
| COMMUNICATION SETTING FILE | DISABLED | ENABLED | ENABLED | DISABLED | DISABLED |
| : | : | : | : | : | : |

(56) References Cited

U.S. PATENT DOCUMENTS

| | | | | |
|---|---|---|---|---|
| 2004/0193896 A1* | 9/2004 | Kaneko | G06F 21/566 | 713/188 |
| 2004/0230318 A1* | 11/2004 | Shimizu | G06F 21/56 | 700/1 |
| 2006/0156030 A1* | 7/2006 | Saika | G06F 21/567 | 713/188 |
| 2006/0174344 A1* | 8/2006 | Costea | G06F 21/564 | 726/24 |
| 2006/0212931 A1* | 9/2006 | Shull | G06F 21/55 | 726/10 |
| 2007/0094539 A1* | 4/2007 | Nakatsuka | H04L 63/145 | 714/38.1 |
| 2008/0040803 A1* | 2/2008 | Ehara | G06F 21/56 | 726/24 |
| 2008/0163372 A1* | 7/2008 | Wang | G06F 21/56 | 726/24 |
| 2008/0184370 A1* | 7/2008 | Ouchi | G06F 21/56 | 726/24 |
| 2011/0032567 A1* | 2/2011 | Ishida | G06F 21/56 | 358/1.15 |
| 2011/0067100 A1* | 3/2011 | Fukuoh | G03G 15/55 | 726/21 |
| 2011/0067109 A1* | 3/2011 | Costea | G06F 21/564 | 726/24 |
| 2011/0173698 A1* | 7/2011 | Polyakov | G06F 11/0748 | 726/23 |
| 2012/0072989 A1* | 3/2012 | Sakai | G06F 21/567 | 726/24 |
| 2012/0198553 A1* | 8/2012 | Suginaka | G06F 21/55 | 726/24 |
| 2015/0288707 A1* | 10/2015 | Liu | H04L 63/145 | 726/24 |
| 2018/0288077 A1* | 10/2018 | Siddiqui | G06F 21/577 | |
| 2018/0293382 A1* | 10/2018 | Murphy, Jr. | G06F 21/568 | |
| 2019/0356680 A1* | 11/2019 | Dogu | G06F 13/00 | |

FOREIGN PATENT DOCUMENTS

| | | | | |
|---|---|---|---|---|
| JP | 2010141705 A | 6/2010 | | |
| JP | 2011065483 A | 3/2011 | | |
| WO | WO-2013017394 A1 * | 2/2013 | | G06F 21/6236 |

* cited by examiner

FIG.3

FILE MANAGEMENT INFORMATION

| FILE NAME | STORAGE INFORMATION | | | | VIRUS CHECKING INFORMATION | | | LATEST USAGE INFORMATION | | |
|---|---|---|---|---|---|---|---|---|---|---|
| | STORAGE DATE AND TIME (TS) | CREATION DATE AND TIME (TP) | FILE SIZE (VS) | CHECKSUM VALUE (CS) | LAST CHECKING DATE AND TIME (TC) | FILE SIZE (VC) | CHECKSUM VALUE (CC) | USAGE DATE AND TIME (TU) | FILE SIZE (VU) | CHECKSUM VALUE (CU) |
| NM1 | TS1 | TP1 | VS1 | CS1 | TC1 | VC1 | CC1 | TU1 | VU1 | CU1 |
| NM2 | TS2 | TP2 | VS2 | CS2 | - | - | - | - | - | - |
| .. | .. | .. | .. | .. | .. | .. | .. | .. | .. | .. |

FIG.4

FILE MANAGEMENT INFORMATION

| FILE NAME | STORAGE INFORMATION | | | | VIRUS CHECKING INFORMATION | | | LATEST USAGE INFORMATION | | |
|---|---|---|---|---|---|---|---|---|---|---|
| | STORAGE DATE AND TIME (TS) | CREATION DATE AND TIME (TP) | FILE SIZE (VS) | CHECKSUM VALUE (CS) | LAST CHECKING DATE AND TIME (TC) | FILE SIZE (VC) | CHECKSUM VALUE (CC) | USAGE DATE AND TIME (TU) | FILE SIZE (VU) | CHECKSUM VALUE (CU) |
| NM1 | TS1 | TP1 | VS1 | CS1 | TC1 | VC1 | CC1 | TU1 | VU1 | CU1 |
| NM2 | TS2 | TP2 | VS2 | CS2 | - | - | - | TU2 | VU2 | CU2 |
| : | : | : | : | : | : | : | : | : | : | : |

FIG.5

FILE MANAGEMENT INFORMATION

| FILE NAME | STORAGE INFORMATION | | | | VIRUS CHECKING INFORMATION | | | | LATEST USAGE INFORMATION | | |
|---|---|---|---|---|---|---|---|---|---|---|---|
| | STORAGE DATE AND TIME (TS) | CREATION DATE AND TIME (TP) | FILE SIZE (VS) | CHECKSUM VALUE (CS) | LAST CHECKING DATE AND TIME (TC) | FILE SIZE (VC) | CHECKSUM VALUE (CC) | | USAGE DATE AND TIME (TU) | FILE SIZE (VU) | CHECKSUM VALUE (CU) |
| NM1 | TS1 | TP1 | VS1 | CS1 | TC2 | VC1 | CC1 | | TU1 | VU1 | CU1 |
| NM2 | TS2 | TP2 | VS2 | CS2 | TC2 | VC2 | CC2 | | TU2 | VU2 | CU2 |
| ... | ... | ... | ... | ... | ... | ... | ... | | ... | ... | ... |

FIG.6

VIRUS TYPE INFORMATION

| | COMMUNICATION FUNCTION | PRINT FUNCTION | SCAN FUNCTION | FILE TRANSMISSION FUNCTION | BROWSER FUNCTION |
|---|---|---|---|---|---|
| VIRUS A (LEAK INTERNAL DATA) | DISABLED | ENABLED | ENABLED | DISABLED | DISABLED |
| VIRUS B (DISABLE INTERNAL DEVICES) | ENABLED | DISABLED | DISABLED | DISABLED | ENABLED |
| VIRUS C (VIEW PARTICULAR SITE) | DISABLED | ENABLED | ENABLED | ENABLED | DISABLED |
| VIRUS D (TAMPER WITH INTERNAL DATA) | ENABLED | DISABLED | DISABLED | DISABLED | ENABLED |
| : | : | : | : | : | : |

FIG. 7

FILE TYPE INFORMATION

| | COMMUNICATION FUNCTION | PRINT FUNCTION | SCAN FUNCTION | FILE TRANSMISSION FUNCTION | BROWSER FUNCTION |
|---|---|---|---|---|---|
| IMAGE FILE | ENABLED | DISABLED | DISABLED | DISABLED | ENABLED |
| COMMUNICATION SETTING FILE | DISABLED | ENABLED | ENABLED | DISABLED | DISABLED |
| ⋮ | ⋮ | ⋮ | ⋮ | ⋮ | ⋮ |

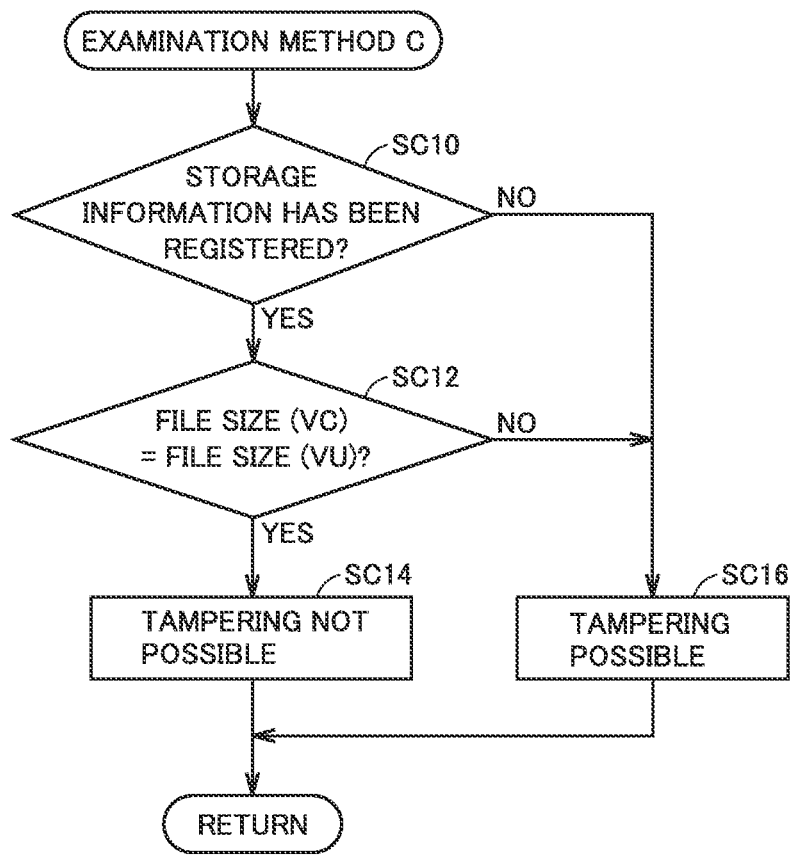

IMAGE PROCESSING APPARATUS AND METHOD OF CONTROLLING THE SAME

CROSS-REFERENCE TO RELATED APPLICATIONS

The entire disclosure of Japanese Patent Application No. 2018-103753, filed on May 30, 2018, is incorporated herein by reference.

BACKGROUND

Technical Field

The present invention relates to image processing apparatuses and methods of controlling the same, and more specifically to controlling an image processing apparatus in accordance with a result of virus checking in the image processing apparatus.

Description of the Related Art

Conventionally, extensive research has been conducted on virus checking in an image processing apparatus such as an MFP (Multi-Functional Peripheral). For example, Japanese Laid-Open Patent Publication No. 2011-65483 discloses a technique of allowing, in a multifunction device such as an MFP, the execution of jobs that use only control modules that have been confirmed as not infected with a virus by virus checking. Japanese Laid-Open Patent Publication No. 2010-141705 discloses a technique for access to a multifunction device from an external terminal, in which security information serving as a safety indicator during the access is acquired, and an access request from the external terminal is authorized on condition that the security information meets security standards. Japanese Laid-Open Patent Publication No. 2006-256104 discloses a multifunction device configured such that, when it is detected that data received from a client PC is contaminated with a virus, a notification of the virus contamination is given on a panel, to prevent secondary infection of the virus contaminating the data. Means for preventing the secondary infection described include: a notification to a user; restriction of all functions and a power shutdown; virus removal; deletion of files from which the virus cannot be removed; and a network shutdown.

Summary

On one hand, the use of virus-infected files should be avoided in consideration of the risk of secondary infection. On the other hand, restricting all functions may also restrict functions not pertinent to the virus infection, causing unreasonable reduction in working efficiency.

In view of these circumstances, there is a need for a technique for appropriately determining functions to be restricted when a virus-infected file is detected in an image processing apparatus.

SUMMARY

According to one or more embodiments of the present invention, an image processing apparatus is provided. The image processing apparatus comprises: a memory that stores one or more files; a file processor that performs each of two or more processes related to the one or more files; and circuitry that performs virus checking on the one or more files stored in the memory. The memory stores virus type information associating a type of a virus with one or more processes of the two or more processes, and file type information associating a type of a file with one or more processes of the two or more processes. The circuitry restricts, of the two or more processes, a process associated with a type of a virus detected in the virus checking, and a process associated with a type of a file possibly infected with the virus detected in the virus checking of the one or more files stored in the memory.

According to one or more embodiments of the present invention, a method of controlling an image processing apparatus is provided. The method comprises: performing virus checking on one or more files stored in a memory of the image processing apparatus; and setting, of two or more processes related to the one or more files and performed by the image processing apparatus, a process associated with a type of a virus detected in the virus checking, and a process associated with a type of a file possibly infected with the virus detected in the virus checking of the one or more files stored in the memory, as restricted processes.

According to one or more embodiments of the present invention, a non-transitory computer-readable storage medium is provided. The medium stores a computer program comprising instructions that, when executed by a computer, cause the computer to perform the method described above.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 shows example contents of file management information according to one or more embodiments of the present invention.

FIG. 4 shows example contents of the updated file management information according to one or more embodiments of the present invention.

FIG. 5 shows other example contents of the updated file management information according to one or more embodiments of the present invention.

FIG. 6 shows example virus type information according to one or more embodiments of the present invention.

FIG. 7 shows example contents of file type information according to one or more embodiments of the present invention.

FIG. 12 is a flowchart of a subroutine in step S328.

DETAILED DESCRIPTION

Hereinafter, embodiments of the present invention will be described with reference to the drawings. However, the scope of the invention is not limited to the disclosed embodiments.

Embodiments of an image processing apparatus are described below with reference to the drawings. In the following description, the same parts and components are designated by the same characters. Their names and functions are also the same. Thus, description thereof will not be repeated.

[1. Configuration of Image Processing Apparatus]

Figure 1:
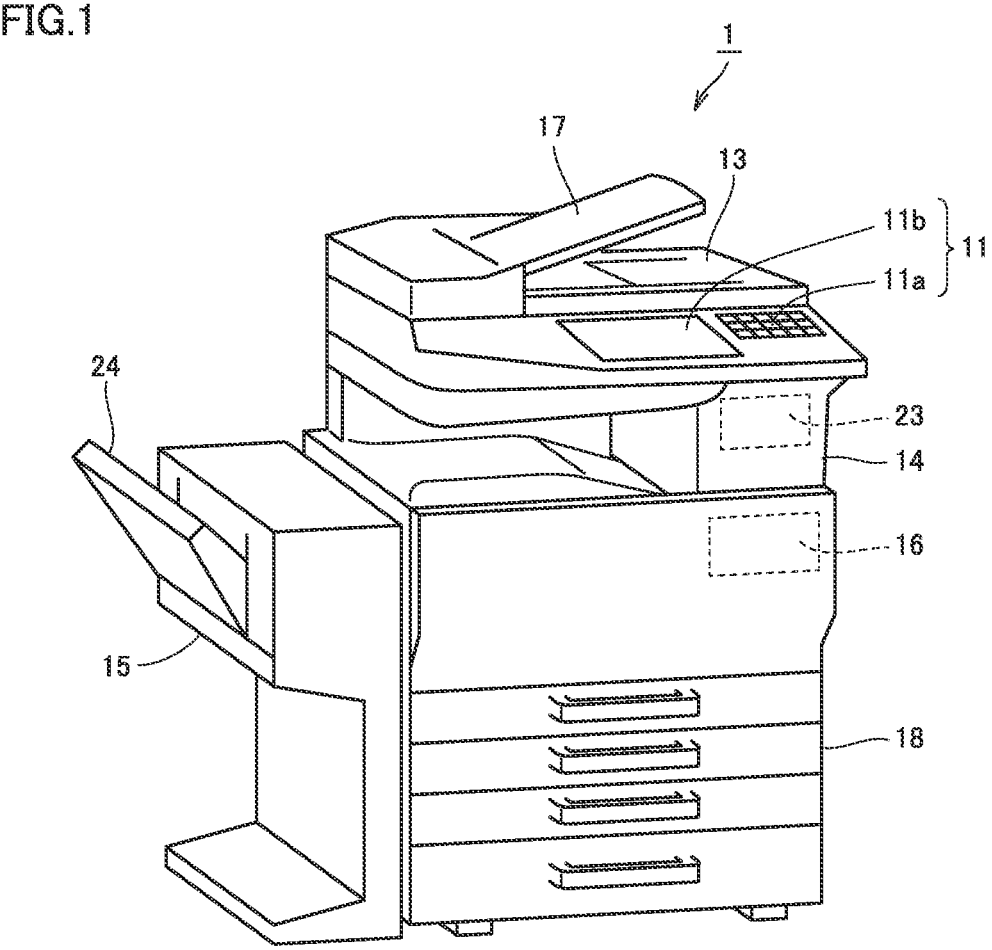
FIG. 1 shows an external appearance of an image processing apparatus according to one or more embodiments of the present invention.
Figure 2:
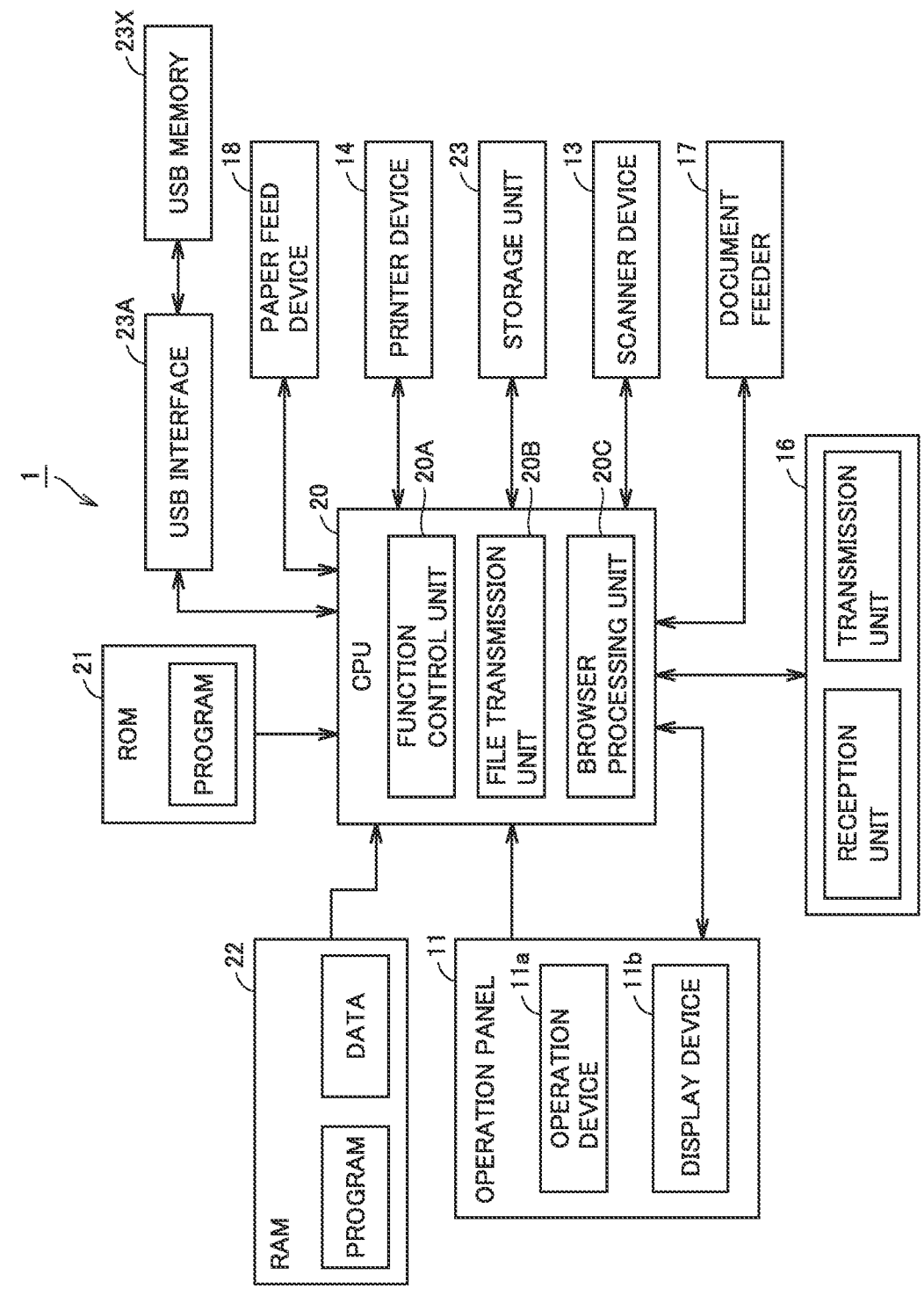
FIG. 2 shows a hardware configuration of the image processing apparatus of FIG. 1.

FIG. 1 shows an external appearance of an image processing apparatus according to one or more embodiments of the present invention. FIG. 2 shows a hardware configuration of the image processing apparatus of FIG. 1.

One example of an image processing apparatus 1 is an MFP, namely, an apparatus having integrated functions such as a copier, a network printer, a scanner, a fax machine, or a document server. Image processing apparatus 1 includes an operation panel 11, a scanner device 13, a printer device 14, a finisher device 15 to perform processes such as stapling and punching, a communication interface 16, a document feeder 17, a paper feed device 18, a CPU (Central Processing Unit) 20, a ROM (Read Only Memory) 21, a RAM (Random Access Memory) 22, a storage unit 23, and a USB (Universal Serial Bus) interface 23A.

Operation panel 11 includes an operation device 11a and a display 11b. Operation device 11a includes: a plurality of keys for inputting numbers, characters, symbols and the like; a comment key to be pressed to create a text for submission; a sensor to recognize various keys that have been pressed; and a transmission circuit to transmit a signal indicating a recognized key to CPU 20.

Display 11b shows: a screen for providing a message or instructions; a screen for a user to input setting contents and processing contents; a screen to display an image formed by image processing apparatus 1 and a result of processing; and the like. Display 11b may be a touch panel. Namely, display 11b and at least a portion of operation device 11a may be integrally configured. Display 11b has the function of sensing a position on the touch panel touched by the user's finger, and transmitting a signal indicating a result of the sensing to CPU 20.

Image processing apparatus 1 can communicate with an external device (for example, a personal computer) via communication interface 16. The external device may have installed thereon an application program and a driver for providing instructions to image processing apparatus 1. The user can thereby use the external device to remotely operate image processing apparatus 1.

Scanner device 13 photoelectrically reads image information such as a photograph, a character or a picture from a document to acquire image data. The acquired image data (concentration data) is converted to digital data at an image processing unit not shown in the figure, subjected to various types of well-known image processing, and then transmitted to printer device 14 or communication interface 16, to be supplied for image printing or data transmission, or to be stored in storage unit 23 for later use.

Printer device 14 prints the image data acquired by scanner device 13, image data received by communication interface 16 from the external device, or an image stored in storage unit 23, onto a recording sheet such as paper or a film. Paper feed device 18 is provided at the lower part of the body of image processing apparatus 1, and is used to supply a recording sheet suitable for an image to be printed to printer device 14. The recording sheet on which the image has been printed by printer device 14, namely, a printed matter, is passed through finisher device 15 and subjected to processes such as stapling and punching depending on the mode setting, and ejected to a tray 24.

Communication interface 16 is a device including a transmission unit and a reception unit for exchanging data with a PC or a facsimile terminal. An NIC (Network Interface Card), a modem, a TA (Terminal Adapter) or the like is used as one example of communication interface 16.

CPU 20 is example circuitry (processor) to execute overall control of the entire image processing apparatus 1, and to control basic functions such as a communication function, a print function, a scan function, a file transmission function and a browser function such that these functions can be used. CPU 20 includes: a function control unit 20A for executing a function using an element other than CPU 20, such as the communication function; a file transmission unit 20B formed of a program module for executing the file transmission function; and a browser processing unit 20C formed of a browser module for executing the browser function. Image processing apparatus 1 may include, instead of or in addition to CPU 20, an application specific integrated circuit (ASIC) for performing the functions executed by CPU 20.

ROM 21 is a memory storing an operation program of CPU 20 and the like. RAM 22 is a memory providing a work area when CPU 20 is operating based on the operation program. CPU 20 loads the operation program from ROM 21 and the like and also loads various types of data, to thereby execute work.

Storage unit 23 is formed of a non-volatile storage device such as a hard disk drive (HDD), and stores various applications, image data of a document read by scanner device 13, and the like.

USB interface 23A is an interface of a USB memory 23X which is removable from image processing apparatus 1. CPU 20 reads information stored in USB memory 23X via USB interface 23A. CPU 20 also writes information to USB memory 23X via USB interface 23A.

[2. File Management Information]

Storage unit 23 stores, together with various files, information for managing each file (file management information). FIG. 3 shows example contents of the file management information according to one or more embodiments of the present invention. Referring to FIG. 3, the file management information associates a file name of each file with storage information, virus checking information, and latest usage information.

The storage information is information obtained when each file was stored in storage unit 23, and includes a storage date and time (TS), a creation date and time (TP), a file size (VS), and a checksum value (CS). The storage date and time (TS) represents a date and time when a file was stored in storage unit 23. The creation date and time (TP) represents a date and time when the file was created. The file size (VS) represents a size of the file when the file was stored in storage unit 23. The checksum value (CS) represents a checksum value of the file when the file was stored in storage unit 23.

When CPU 20 externally downloads a file, for example, CPU 20 registers a creation date and time and a size pertaining to this file as the creation date and time (TP) and the file size (VS) in the storage information. CPU 20 also registers a date and time of the downloading as the storage date and time (TS). Moreover, CPU 20 calculates a checksum value of the file at that point in time, and registers the value as the checksum value (CS) in the storage information. Any algorithm may be used for the calculation of the checksum value.

The virus checking information is information obtained when the latest virus checking was performed in image processing apparatus 1, and includes a last checking date and time (TC), a file size (VC), and a checksum value (CC). The last checking date and time (TC) represents a date and time of the last virus checking. The file size (VC) represents a size of each file when the last virus checking was performed. The checksum value (CC) represents a checksum value of each file when the last virus checking was performed.

CPU 20 executes virus checking regularly, for example, and updates the last checking date and time (TC) each time the virus checking is performed. CPU 20 also acquires (or calculates) a size and a checksum value of each file in each virus checking, and registers them as the file size (VC) and the checksum value (CC) in the virus checking information.

The latest usage information is information obtained when the file was accessed after the virus checking, and includes a usage date and time (TU), a file size (VU), and a checksum value (CU).

The usage date and time (TU) represents the latest date and time when the file was accessed. The file size (VU) represents a size of the file after the end of this access. The checksum value (CU) represents a checksum value of the file after the end of this access.

When a file is saved after being edited, for example, CPU 20 registers a date and time of the saving as the usage date and time (TU). CPU 20 also acquires (or calculates) a size and a checksum value of the saved file, and registers them as the file size (VU) and the checksum value (CU). The checksum value (CS), the checksum value (CC) and the checksum value (CU) are calculated in accordance with the same type of algorithm, according to one or more embodiments. As a result, it can be determined that no change has been made to the file by a comparison of the checksum values.

In the example of FIG. 3, information on two files (their file names are "NM1" and "NM2") has been stored. For the purpose of illustration, a number is added to the end of the file name of each file. The same number as that added to the end of a file name is added to the value of the storage date and time and the like of each file, such as "TS1."

FIG. 3 shows that, after file NM1 was stored in storage unit 23, virus checking was performed at time TC1 (the last checking date and time (TC) of file NM1). FIG. 3 also shows that file NM2 was stored in storage unit 23 after the virus checking at time TC1. Virus checking has not yet been performed after file NM2 was stored in storage unit 23. Thus, file NM2 does not have values for the virus checking information. FIG. 3 further shows that file NM2 has not yet been accessed since file NM2 was stored in storage unit 23. Thus, file NM2 does not have the latest usage information.

FIG. 4 shows example contents of the updated file management information according to one or more embodiments of the present invention. FIG. 4 shows that, after the state shown in FIG. 3, file NM2 was accessed at time TU2 (the usage date and time (TU) of file NM2 in FIG. 4).

This access has caused a change in the size of file NM2 from VS2 to VU2. VS2 and VU2 may be the same value. This access has also caused a change in the checksum value of file NM2 from CS2 to CU2. CS2 and CU2 may be the same value.

FIG. 5 shows other example contents of the updated file management information according to one or more embodiments of the present invention. FIG. 5 shows that, after the state shown in FIG. 4, virus checking was performed at time TC2 (the last checking date and time (TC) of file NM1 and file NM2 in FIG. 5).

In one or more embodiments, the "virus checking" may refer to only step S10 in FIG. 8 which will be described later, or may refer to step S10 and its associated steps (steps shown in FIGS. 8 to 12).

[3. Virus Type Information]

FIG. 6 shows example virus type information according to one or more embodiments of the present invention. The virus type information associates the type of a computer virus with whether to enable or disable each function of image processing apparatus 1. When a virus is detected in virus checking, CPU 20 restricts functions associated in a given manner (for example, "disabled") with the type of this virus in the virus type information. The "restrict" means, for example, controlling image processing apparatus 1 such that this function is not performed even if the execution of this function is indicated.

The virus type information is stored in storage unit 23, for example. An administrator of image processing apparatus 1 can update the virus type information by operating operation device 11a, for example. The administrator specifies, in accordance with a virus definition file, for example, functions to be restricted when each type of virus is detected, and updates the virus type information such that these functions are restricted.

In the example of FIG. 6, a communication function, a print function, a scan function, a file transmission function, and a browser function are illustrated as the functions of image processing apparatus 1.

The communication function is, for example, a function of transmitting and receiving data to and from another device by means of communication interface 16. The print function is, for example, a function of printing an image on a recording sheet by means of printer device 14. The scan function is, for example, a function of creating image data of a document by means of scanner device 13. The file transmission function is, for example, a function of transmitting data stored in storage unit 23 and/or image data generated by scanner device 13 to an external device by means of communication interface 16. The browser function is, for example, a function of accessing a network to view a web page by means of communication interface 16.

Each function is controlled by CPU 20 operating as function control unit 20A. The file transmission function may be executed by CPU 20 operating as file transmission unit 20B. The browser function may be executed by CPU 20 operating as browser processing unit 20C. Each of function control unit 20A, file transmission unit 20B and browser processing unit 20C may be implemented as a program module.

The example of FIG. 6 includes information on four types of viruses represented as viruses A to D. In FIG. 6, the characteristic of each virus is indicated in parentheses, with a restricted function indicated as "disabled" and a non-restricted function indicated as "enabled."

Virus A has the characteristic of leaking internal data of image processing apparatus 1 (data stored in a storage device within image processing apparatus 1 such as storage unit 23) to the outside of image processing apparatus 1. In the virus type information, for virus A, for example, the communication function, the file transmission function and the browser function are indicated as "disabled," and the print function and the scan function are indicated as "enabled." Accordingly, when virus A is detected in image processing apparatus 1, CPU 20 restricts the execution of the communication function, the file transmission function and the browser function, and does not restrict the execution of the print function and the scan function.

Virus B has the characteristic of disabling internal devices (elements within image processing apparatus 1; for example, printer device 14, scanner device 13, document feeder 17 and/or paper feed device 18). In accordance with FIG. 6, when virus B is detected, CPU 20 restricts the execution of the print function, the scan function and the file transmission function of image processing apparatus 1, and does not restrict the execution of the communication function and the browser function.

Virus C has the characteristic of forcibly causing a computer to view a particular site. In accordance with FIG. 6, when virus C is detected, CPU 20 restricts the execution of the communication function and the browser function of image processing apparatus 1, and does not restrict the execution of the print function, the scan function and the file transmission function.

Virus D has the characteristic of tampering with the internal data of image processing apparatus 1. In accordance with FIG. 6, when virus D is detected, CPU 20 restricts the execution of the print function, the scan function and the file transmission function of image processing apparatus 1, and does not restrict the execution of the communication function and the browser function.

[4. File Type Information]

FIG. 7 shows example contents of file type information according to one or more embodiments of the present invention. The file type information associates the type of a file with the functions of image processing apparatus 1. When it is determined that a certain type of file is possibly infected with a virus in virus checking, CPU 20 restricts the execution of functions associated in a given manner (for example, "disabled") with this type in image processing apparatus 1.

In the example of FIG. 7, an "image file" and a "communication setting file" are illustrated as file types. The "image file" is a file representing an image, and corresponds to a file having a predetermined extension such as ".img" or ".png." The "communication setting file" is a file describing setting information for communication interface 16, and corresponds to a file having a unique extension in one example. The setting information includes an IP (Internet Protocol) of image processing apparatus 1, for example.

In the "image file" of FIG. 7, the communication function and the browser function are indicated as "enabled," and the print function, the scan function and the file transmission function are indicated as "disabled." Accordingly, when a file determined to be possibly infected with a virus in virus checking includes the image file, CPU 20 restricts the execution of the print function, the scan function and the file transmission function, and does not restrict the execution of the communication function and the browser function.

In accordance with FIG. 7, when a file determined to be possibly infected with a virus in virus checking includes the communication setting file, CPU 20 restricts the execution of the communication function, the file transmission function and the browser function, and does not restrict the execution of the print function and the scan function.

[5. Flow of Process]

Figure 8:
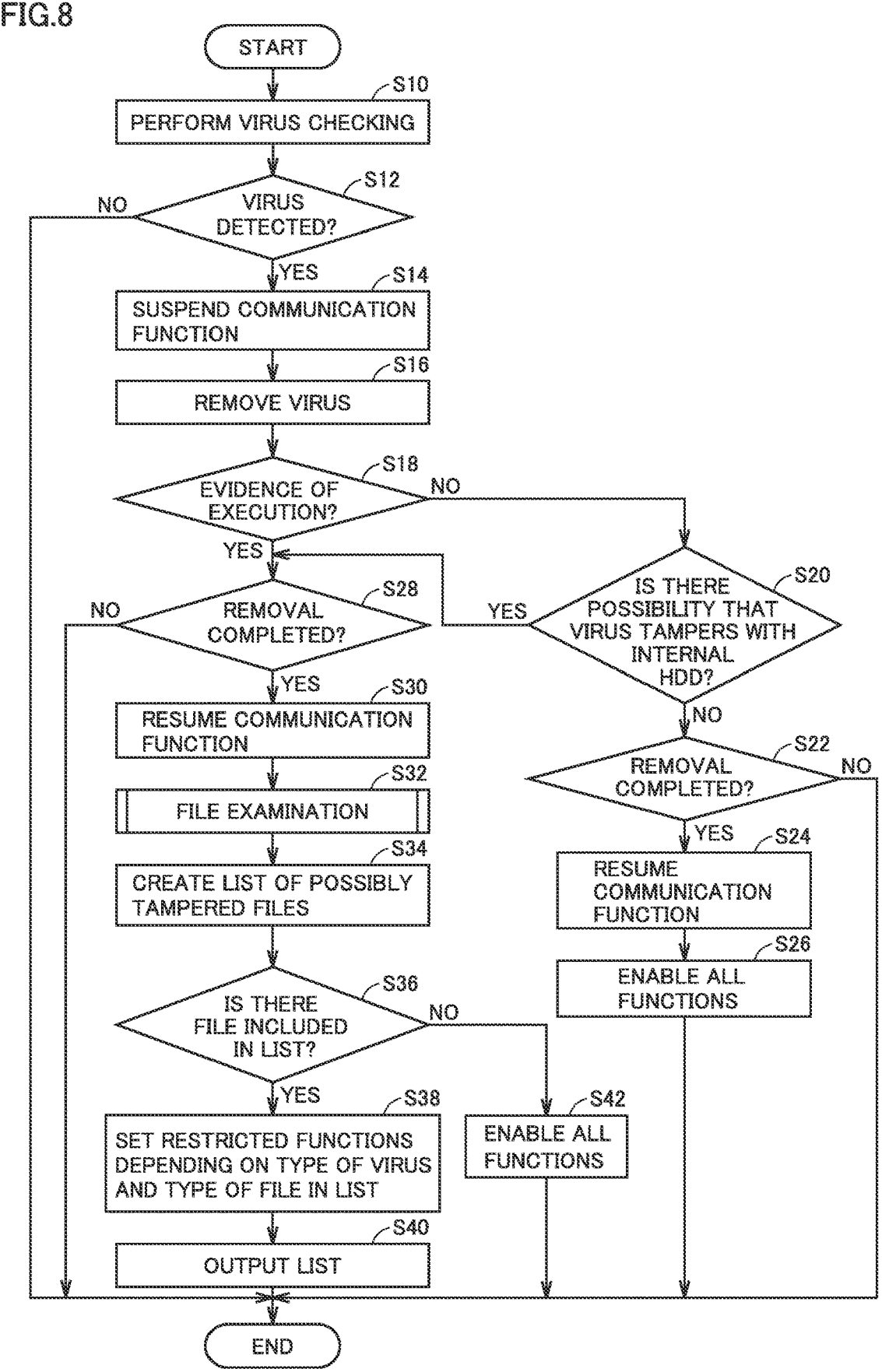
FIG. 8 is a flowchart of a process performed in connection with virus checking in an image processing apparatus according to one or more embodiments of the present invention.

FIG. 8 is a flowchart of a process performed in connection with virus checking in image processing apparatus 1 according to one or more embodiments of the present invention. In one example, the process of FIG. 8 is implemented by CPU 20 executing a given program. A flow of this process id described with reference to FIG. 8. One example timing of the start of the process of FIG. 8 is when a preset time arrives. Another example is when USB memory 23X is mounted on USB interface 23A. Still another example is when a user indicates the execution of virus checking via operation device 11a.

In step S10, CPU 20 executes virus checking on each file stored in storage unit 23. On this occasion, CPU 20 may update the "virus checking information" in the file management information for each file that has been subjected to the virus checking.

In step S12, CPU 20 determines whether or not a virus has been detected in the virus checking in step S10. When it is determined that a virus has not been detected (NO in step S12), CPU 20 causes the process of FIG. 8 to end. When it is determined that a virus has been detected (YES in step S12), CPU 20 causes the control to proceed to step S14.

In step S14, CPU 20 suspends (temporarily restricts) the communication function. As a result, the communication with an external device by means of communication interface 16 is cut off.

In step S16, CPU 20 executes control for removing the virus detected in the virus checking in step S10. In one example, CPU 20 accesses the virus definition file, acquires a method for removing the detected virus by reference to this virus definition file, and executes this method to remove the virus.

In step S18, CPU 20 determines whether or not there is evidence that the detected virus has been executed. One example of the virus execution is that an executable file infected with the virus has been executed. Another example is that a document file infected with the virus has been opened. Whether or not there is evidence for execution is determined, in one example, based on whether or not an operation log of CPU 20 includes the execution of this file, and determined, in another example, based on whether or not the usage date and time (TU) of this file represents a date and time after the last checking date and time (TC). The usage date and time (TU) is an example history of the file. When it is determined that there is evidence that the virus has been executed (YES in step S18), CPU 20 causes the control to proceed to step S28, and otherwise (NO in step S18) causes the control to proceed to step S20.

In step S20, CPU 20 determines whether or not there is a possibility that the detected virus tampers with data within an internal HDD (storage unit 23). In one example, CPU 20 implements the determination in step S20 by determining whether or not the type of the detected virus is a particular type (such as virus D in FIG. 6). When it is determined that there is a possibility that the detected virus tampers with the data within the internal HDD (YES in step S20), CPU 20 causes the control to proceed to step S28, and otherwise (NO in step S20) causes the control to proceed to step S22.

In step S22, CPU 20 determines whether or not the virus removal started in step S16 has been completed. When it is determined that the virus removal has been completed (YES in step S22), CPU 20 causes the control to proceed to step S24, and otherwise (NO in step S22) causes the process of FIG. 8 to end.

In step S24, CPU 20 resumes the communication function suspended in step S14. As a result, image processing apparatus 1 resumes the communication with the external device.

In image processing apparatus 1, when the detected virus is not removed by CPU 20, a "NO" determination is made in step S22, and the process of FIG. 8 ends. Before the end, CPU 20 may give a notification (display, speech, and/or printing of a report) that image processing apparatus 1 is infected with a virus which is not removed by this CPU 20.

In step S26, CPU 20 resumes the functions, if any, that were suspended other than the communication function in image processing apparatus 1, and then causes the process of FIG. 8 to end. As a result, although the communication function is temporarily suspended when a virus is detected in image processing apparatus 1, if there is no possibility that this virus tampers with the data within the internal HDD, all functions including the communication function are resumed after the removal of this virus has been completed.

In step S28, CPU 20 determines whether or not the virus removal started in step S16 has been completed, as in step S22. When it is determined that the virus removal has been completed (YES in step S28), CPU 20 causes the control to proceed to step S30, and otherwise (NO in step S28) causes the process of FIG. 8 to end.

In step S30, CPU 20 resumes the communication function suspended in step S14. As a result, image processing apparatus 1 resumes the communication with the external device.

In step S32, CPU 20 determines, for each of the files stored in the internal HDD (storage unit 23), whether or not there is a possibility that the file has been tampered with by secondary infection of the virus.

Figure 9:
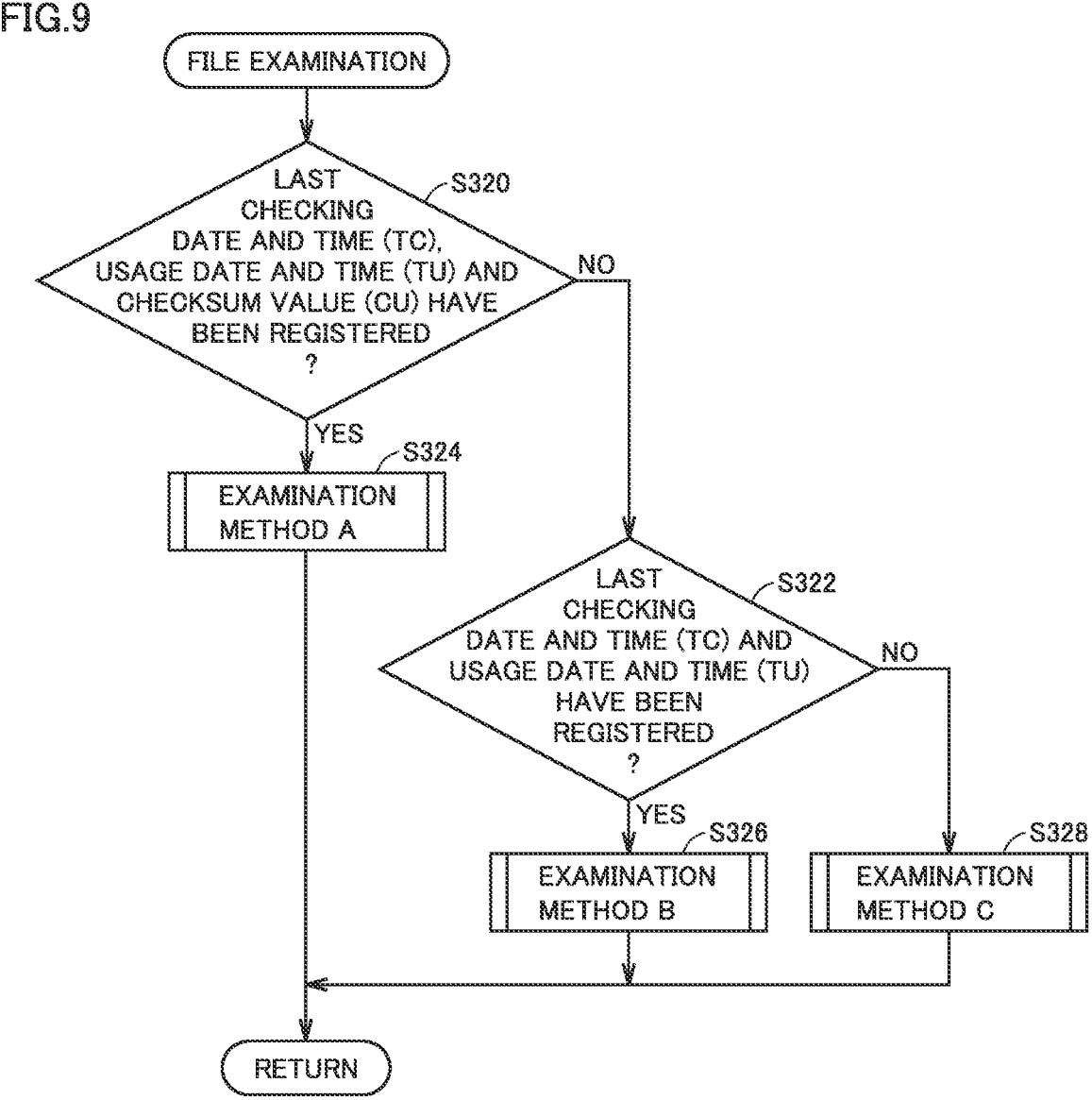
FIG. 9 is a flowchart of a subroutine in step S32 of FIG. 8.

FIG. 9 is a flowchart of a subroutine in step S32 of FIG. 8. The file examination in step S32 is described with reference to FIG. 9.

In step S320, CPU 20 determines whether or not the last checking date and time (TC), the usage date and time (TU) and the checksum value (CU) have been registered in the file management information for a file to be processed. When it is determined that all of these three types of information have been registered for the file to be processed (YES in step S320), CPU 20 causes the control to proceed to step S324. When it is determined that at least one of the three types has not been registered (NO in step S320), CPU 20 causes the control to proceed to step S322.

In step S322, CPU 20 determines whether or not the last checking date and time (TC) and the usage date and time (TU) have been registered in the file management information for the file to be processed. When it is determined that both of these two types have been registered for the file to be processed (YES in step S322), CPU 20 causes the control to proceed to step S326. When it is determined that at least one of them has not been registered (NO in step S322), CPU 20 causes the control to proceed to step S328.

Figure 10:
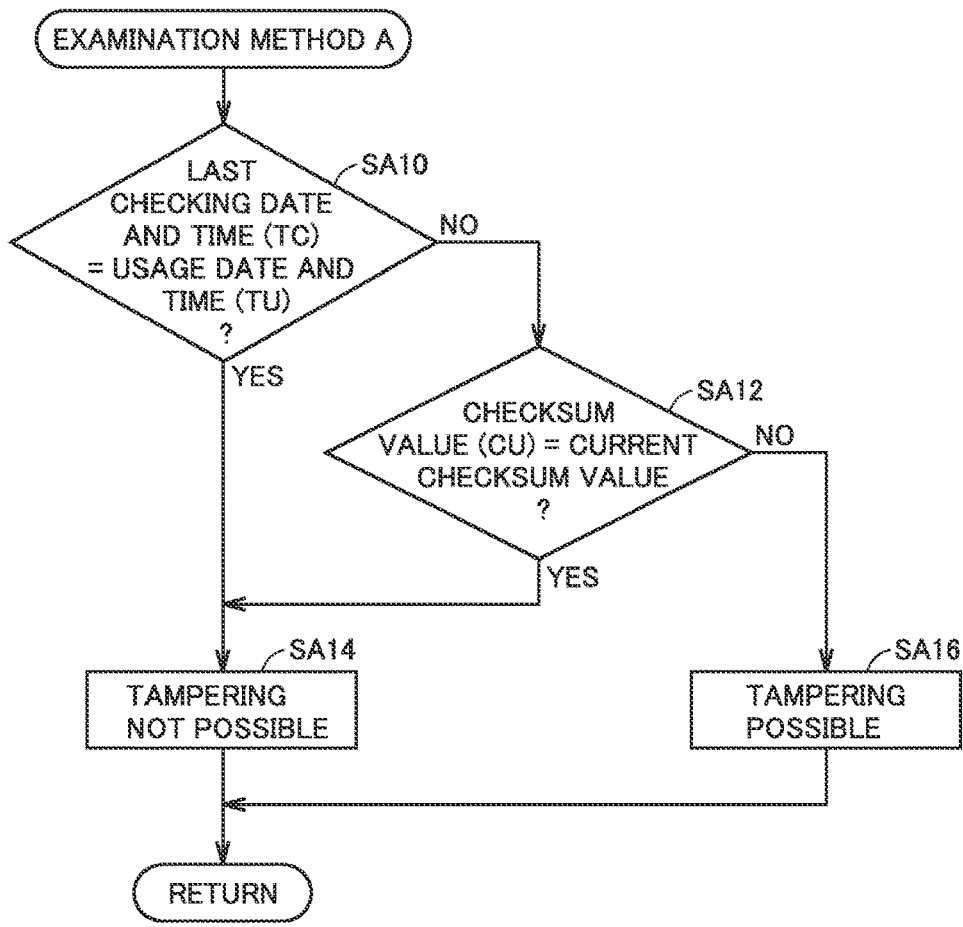
FIG. 10 is a flowchart of a subroutine in step S324.
Figure 11:
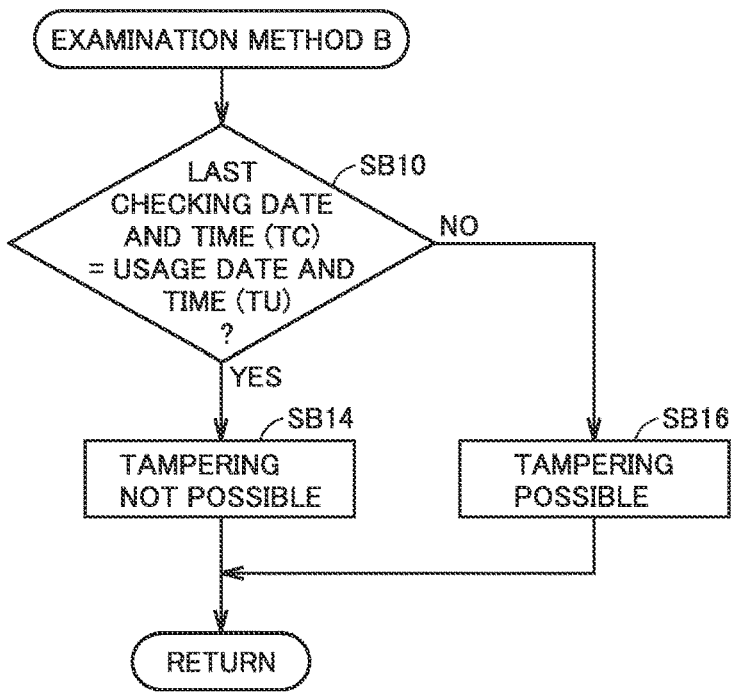
FIG. 11 is a flowchart of a subroutine in step S326.

In steps S324, S326 and S328, CPU 20 sets examination methods A, B and C, respectively, as a method of examining a processing object. FIG. 10 represents examination method A, and is a flowchart of a subroutine in step S324. FIG. 11 represents examination method B, and is a flowchart of a subroutine in step S326. FIG. 12 represents examination method C, and is a flowchart of a subroutine in step S328.

Examination method A is described with reference to FIG. 10. In step SA10, CPU 20 determines whether or not the last checking date and time (TC) and the usage date and time (TU) match each other. The last checking date and time (TC) means a date and time of virus checking that was performed before the virus checking being performed. In one example, that the last checking date and time (TC) and the usage date and time (TU) match each other means that no change has been made to the file to be processed since the last virus checking. When it is determined that they match each other (YES in step SA10), CPU 20 causes the control to proceed to step SA14, and otherwise (NO in step SA10) causes the control to proceed to step SA12.

In step SA12, CPU 20 calculates a checksum value of the file to be processed (current checksum value), and determines whether or not the current checksum value and the checksum value (CU) match each other. In one example, that the current checksum value and the checksum value (CU) match each other means that no change has been made to the file to be processed after this file was last updated. When it is determined that these values match each other (YES in step SA12), CPU 20 causes the control to proceed to step SA14, and otherwise (NO in step SA12) causes the control to proceed to step SA16.

In step SA14, CPU 20 generates an examination result indicating that there is no possibility that the file to be processed has been tampered with (is infected with a virus), and then causes the control to return to FIG. 8 via FIG. 9.

In step SA16, CPU 20 generates an examination result indicating that there is a possibility that the file to be processed has been tampered with (is infected with a virus), and then causes the control to return to FIG. 8 via FIG. 9.

Examination method B is described with reference to FIG. 11. In step SB10, CPU 20 determines whether or not the last checking date and time (TC) and the usage date and time (TU) match each other. In one example, that the last checking date and time (TC) and the usage date and time (TU) match each other means that no change has been made to the file to be processed after the last virus checking was performed. When it is determined that these values match each other (YES in step SB10), CPU 20 causes the control to proceed to step SB14, and otherwise (NO in step SB10) causes the control to proceed to step SB16.

In step SB14, CPU 20 generates an examination result indicating that there is no possibility that the file to be processed has been tampered with (is infected with a virus), and then causes the control to return to FIG. 8 via FIG. 9.

In step SB16, CPU 20 generates an examination result indicating that there is a possibility that the file to be processed has been tampered with (is infected with a virus), and then causes the control to return to FIG. 8 via FIG. 9.

Examination method C is described with reference to FIG. 12. In step SC10, CPU 20 determines whether or not the file management information includes the storage information on the file to be processed. When it is determined that the file management information includes the storage information on the file to be processed (YES in step SC10), CPU 20 causes the control to proceed to step SC12, and otherwise (NO in step SC10) causes the control to proceed to step S16.

In step SC12, CPU 20 determines whether or not the file size (VC) of the virus checking information and the file size (VU) of the latest usage information match each other. In one example, when these values match each other, it is inferred that no change has been made to the file to be processed since the last virus checking. When it is determined that these values match each other (YES in step SC12), CPU 20 causes the control to proceed to step SC14, and otherwise (NO in step SC12) causes the control to proceed to step SC16.

In step SC14, CPU 20 generates an examination result indicating that there is no possibility that the file to be processed has been tampered with (is infected with a virus), and then causes the control to return to FIG. 8 via FIG. 9.

In step SC16, CPU 20 generates an examination result indicating that there is a possibility that the file to be processed has been tampered with (is infected with a virus), and then causes the control to return to FIG. 8 via FIG. 9.

In the process shown in FIG. 12, when the storage information has not been registered for the file to be processed, it is determined that this file is possibly infected with a virus (NO in step SC10→step SC16). In one example, the storage information is information that should be registered for all files. Thus, if the storage information has not been registered for a given file, it is highly likely that the storage information has been deleted by tampering of information on this file. In the process shown in FIG. 12, it can be determined that such a file is possibly infected with a virus.

Although one of examination methods A to C is performed for each file in the description above with reference to FIGS. 9 to 12, two or all of examination methods A to C may be performed. This can allow each file to be examined more accurately for virus infection.

Returning to FIG. 8, in step S32, the file examination is conducted for each of the files in storage unit 23. Then, in step S34, CPU 20 creates a list of files for which an examination result has been generated indicating that there is a possibility that the file has been tampered with in the file examination. In step S32, the examination may be conducted only for files that meet preset conditions of the files in storage unit 23.

In step S36, CPU 20 determines whether or not at least one file is included in the list created in step S34. When it is determined that at least one file is included in the list (YES in step S34), CPU 20 causes the control to proceed to step S38, and otherwise causes the control to proceed to step S42. Namely, when there is no possibility that any of the examined files are infected with a virus, the control proceeds to step S42.

In step S42, CPU 20 resumes the functions, if any, that were suspended other than the communication function in image processing apparatus 1, as in step S24, and then causes the process of FIG. 8 to end.

In step S38, CPU 20 sets restricted functions depending on the type of the virus detected in step S10, and the type of the file in the list created in step S36. One example of this setting is setting a restriction flag to restrict the execution of each function, for example. CPU 20 does not execute a function for which the restriction flag has been set, even if the execution of the function is requested. CPU 20 may reset the restriction flags for all functions in steps S24 and S30.

For example, when the type of the detected virus is "virus C," and the aforementioned list includes only a file of the type "communication setting file," then the communication function, the file transmission function and the browser function are set as restricted functions, while the print function and the scan function are not set as restricted functions. This corresponds to the fact that functions to be restricted due to the virus type being the "virus C" are the communication function and the browser function (FIG. 6), and that functions to be restricted due to the virus type being the "communication setting file" are the communication function, the file transmission function and the browser function (FIG. 7).

In this case, a copying job can be performed. This is because the copying job uses the scan function and the print function, and doe not use the communication function, the file transmission function and the browser function.

In addition, a Scan_to_Box job (job to store image data generated by scanning in a given box within storage unit 23) can be performed. This is because the Scan_to_Box job uses the scan function, and doe not use the communication function, the file transmission function and the browser function.

On the other hand, a Scan_to_PC job (job to transmit image data generated by scanning to an external PC) cannot be performed. The Scan_to_PC job uses the scan function and the file transmission function. Since the file transmission function is restricted, the Scan_to_PC job cannot be performed.

When the execution of a job using some functions is indicated while those functions are restricted, CPU 20 may give a notification that the job cannot be performed since some functions are restricted.

In step S40, CPU 20 outputs (for example, prints) the list created in step S34, and then causes the process of FIG. 8 to end. The output of the list can allow the user to determine which files are possibly infected with a virus.

[6. Summary of Disclosure]

One or more embodiments of the present invention can be summarized as follows:

<1> An image processing apparatus 1 includes: a storage unit 23 that stores one or more files; a function performing unit (a scanner device 13, a printer device 14, a file transmission unit 20B, a browser processing unit 20C, and the like) that performs each of two or more functions related to the one or more files; and a controller (a function control unit 20A) that executes virus checking on the one or more files stored in the storage unit. The storage unit stores virus type information (FIG. 6) associating a type of a virus with one or more functions of the two or more functions, and file type information (FIG. 7) associating a type of a file with one or more functions of the two or more functions. The controller restricts, of the two or more functions, a function associated with a type of a virus detected in the virus checking (for example, a communication function and a browser function indicated as "disabled" for a type "virus C"), and a function associated with a type of a file possibly infected with the virus detected in the virus checking of the one or more files stored in the storage unit (for example, the communication function, a file transmission function and the browser function indicated as "disabled" for a type "communication setting file") (step S38).

Performing a function related to a file can be interpreted as processing the file. In this sense, the function performing unit may also be referred to as a device that executes a process related to a file, namely, a file processor or a file process execution device.

<2> When a file infected with the virus detected in the virus checking has not been executed, and the type of the virus detected in the virus checking is a type that does not tamper with the one or more files in the storage unit, the controller may cancel the restriction of the two or more functions after the virus is removed (step S24).

<3> The controller may determine whether or not the file has been executed based on a log of access to the file, or a history of the file stored in the storage unit (step S18).

<4> When the type of the virus detected in the virus checking is a type that tampers with the one or more files in the storage unit (YES in step S20), the controller may examine the one or more files in the storage unit for possible infection with the virus detected in the virus checking (step S32).

<5> The two or more functions may include a function of communicating with an external device (communication function). When a virus is detected in the virus checking, the controller may execute removal of the virus after restricting the function of communicating with the external device (steps S14 and S16).

<6> The controller may give a notification of the file possibly infected with the virus (step S40).

<7> The controller may examine each file in the storage unit for possible infection with the virus by using at least one of: information on the file obtained when the file was stored in the storage unit ("storage information" in FIG. 3 and the like); information on the file at last virus checking ("virus checking information" in FIG. 3 and the like); information on the file at latest usage ("latest usage information" in FIG.

3 and the like); and information on the file at present virus checking ("current checksum value" in step SA12 of FIG. 10) (FIGS. 10 to 12).

<8> The information on the file at the latest usage may include information specifying a date and time of the latest usage (usage date and time (TU)). The information on the file at the last virus checking may include information specifying a date and time of the last virus checking ("last checking date and time (TC)" in FIG. 3 and the like), and a checksum value of the file at the last virus checking ("checksum value (CC)" in FIG. 3 and the like). The information on the file at the present virus checking may include a checksum value of the file at the present virus checking ("current checksum value" in step SA12 of FIG. 10).

According to one or more embodiments of the present invention, functions to be restricted are determined based not only on the type of a virus, but also on the type of a file possibly infected with the virus. As a result, when a file in the image processing apparatus is infected with a virus, minimum necessary functions are restricted.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing apparatus that executes a plurality of processes related to a file, the apparatus comprising:
a memory that stores a file;
a processor that executes virus checking on the file, wherein
the memory stores:
virus type information that associates a type of a virus detected during the virus checking with at least one of the plurality of processes; and
file type information that associates a type of file with at least one of the plurality of processes, and
the processor restricts one of the plurality of processes associated with the type of the detected virus, and another of the plurality of processes associated with the type of file possibly infected with the detected virus.

2. The image processing apparatus according to claim 1, wherein
when the file infected with the detected virus has not been executed and the type of the detected virus is a type that does not tamper with the file in the memory, the processor cancels the restriction of the plurality of processes after the virus is removed.

3. The image processing apparatus according to claim 2, wherein
the processor determines whether the file has been executed based on a log of access to the file or a history of the file stored in the memory.

4. The image processing apparatus according to claim 1, wherein
when the type of the detected virus is a type that tampers with the file in the memory, the processor examines the file in the memory for possible infection with the detected virus.

5. The image processing apparatus according to claim 1, wherein
the plurality of processes include a process of communicating with an external device, and
when a virus is detected in the virus checking, the processor removes the virus after restricting the process of communicating with the external device.

6. The image processing apparatus according to claim 1, wherein
the processor notifies that the file is possibly infected with the virus.

7. The image processing apparatus according to claim 1, wherein
the processor examines the file in the memory for possible infection with the virus using at least one of: information on the file obtained when the file was stored in the memory; information on the file at a last virus checking; information on the file at a latest usage; and information on the file at a present virus checking.

8. The image processing apparatus according to claim 7, wherein
the information on the file at the latest usage includes information specifying a date and time of the latest usage,
the information on the file at the last virus checking includes information specifying a date and time of the last virus checking, and a checksum value of the file at the last virus checking, and
the information on the file at the present virus checking includes a checksum value of the file at the present virus checking.

9. A method of controlling an image processing apparatus that executes a plurality of processes related to a file, the method comprising:
executing virus checking on a file stored in a memory of the image processing apparatus; and
setting, as restricted processes, one of the plurality of processes associated with a type of a virus detected during the virus checking, and another of the plurality of processes associated with a type of file possibly infected with the virus detected during the virus checking.

10. The method according to claim 9, further comprising:
when the file infected with the detected virus has not been executed and the type of the detected virus is a type that does not tamper with the file in the memory, cancelling the restriction of the plurality of processes after the virus is removed.

11. The method according to claim 10, further comprising:
determining whether the file has been executed based on a log of access to the file, or a history of the file stored in the memory.

12. The method according to claim 9, further comprising:
when the type of the detected virus is a type that tampers with the file in the memory, examining the file in the memory for possible infection with the detected virus.

13. The method according to claim 9, wherein
the set restricted processes include a process of communicating with an external device, and
the method further comprises, when a virus is detected in the virus checking, removing the virus after restricting the process of communicating with the external device.

14. The method according to claim 9, further comprising:
giving a notification of the file possibly infected with the virus.

15. The method according to claim 9, further comprising:
examining the file in the memory for possible infection with the virus by using at least one of: information on the file obtained when the file was stored in the memory; information on the file at last virus checking;

information on the file at latest usage; and information on the file at present virus checking.

16. The method according to claim 15, wherein
the information on the file at the latest usage includes information specifying a date and time of the latest usage,
the information on the file at the last virus checking includes information specifying a date and time of the last virus checking, and a checksum value of the file at the last virus checking, and
the information on the file at the present virus checking includes a checksum value of the file at the present virus checking.

17. A non-transitory computer-readable storage medium storing a computer program comprising instructions that, when executed by a computer, cause the computer to execute the method according to claim 9.

* * * * *